United States Patent
Spiess et al.

(10) Patent No.: US 6,413,189 B1
(45) Date of Patent: Jul. 2, 2002

(54) METHOD AND DEVICE FOR CONTROLLING A MOTOR VEHICLE DRIVE TRAIN

(75) Inventors: Martin Spiess, Uhldingen; Christoph Goebel, Immenstaad; Willibald Probst, Wangen, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/720,613
(22) PCT Filed: Jul. 3, 1999
(86) PCT No.: PCT/EP99/04639
§ 371 (c)(1),
(2), (4) Date: Dec. 20, 2000
(87) PCT Pub. No.: WO00/03160
PCT Pub. Date: Jan. 20, 2000

(30) Foreign Application Priority Data

Jul. 10, 1998 (DE) .......................... 198 30 953

(51) Int. Cl.$^7$ .......................... F16H 47/04; F16H 61/46
(52) U.S. Cl. .......................... 477/110; 477/111
(58) Field of Search .......................... 477/110, 111

(56) References Cited

U.S. PATENT DOCUMENTS

| 4,082,013 A | | 4/1978 | Dornfeld et al. ............... 74/866 |
| 4,616,530 A | * | 10/1986 | Tanaka et al. ............... 477/110 |
| 5,529,546 A | | 6/1996 | Ishino et al. .................. 475/76 |
| 5,658,088 A | * | 8/1997 | Samuelsson ................ 477/111 |

FOREIGN PATENT DOCUMENTS

| DE | 35 26 603 A1 | 2/1986 |
| DE | 196 12 893 A1 | 10/1996 |
| DE | 196 42 503 A1 | 5/1997 |
| GB | 2 297 811 A | 8/1996 |
| WO | 97/01049 | 1/1997 |

* cited by examiner

Primary Examiner—Dirk Wright
(74) Attorney, Agent, or Firm—Davis & Bujold, P.L.L.C.

(57) ABSTRACT

Method and device for controlling a motor vehicle drive train. To reverse the travel direction, the input torque is transmitted with pressure modulation from one clutch ($K_v$) of one travel direction to one clutch ($K_r$) of the opposite travel direction. If at the time that a reverse travel direction is selected and the speed of travel exceeds a set maximum value ($V_{R,max}$), the speed of travel is automatically reduced to the maximum value first by continuous change of the ratio of the transmission (2) of the drive train.

14 Claims, 4 Drawing Sheets

METHOD AND DEVICE FOR CONTROLLING A MOTOR VEHICLE DRIVE TRAIN

BACKGROUND OF THE INVENTION

The invention relates to a method and device for controlling the drive train of a motor vehicle.

SUMMARY OF THE INVENTION

WO 97/01049 disclosed a hydrostatic mechanical power split gear whose ratio is continuously variable without interrupting the traction force or the thrust (power shift gear). A mechanism power branch and a hydrostatic power branch are driven by a common input shaft and summed in a coupled gearing. The coupled gearing contains several planetary gear sets. The output of the planetary gear is connected with a reversing gear and can optionally be connected via a clutch $K_v$ for forward motion or clutch $K_r$ for reverse motion, and the reversing gear with the output shaft. With the power split gearing known already, a motor vehicle can be reversed at low speeds via the clutches $K_v$ and $K_r$, i.e. its travel direction can be reversed. This means, for example, that the clutch $K_r$ can already be closed with pressure modulation when the vehicle is still moving forward. Starting from a specific modulation pressure, the clutch $K_v$ previously closed, can be opened and the forward moving vehicle decelerated via the clutch $K_r$ until stopping, and then accelerated in reverse direction of motion. The actually adjusted gear ratio remains constant during the reversal operation. It is only changed again after the reversal via the clutches $K_v/K_r$ is terminated. Thereby can be obtained with satisfactory shifting comfort quick reversals of travel direction without interrupting the traction.

In a drive train of a motor vehicle which has a transmission with continuously variable ratio and shiftable clutches for reversing the travel direction, the invention solves the problem by providing a possibility by which at vehicle speeds higher than in the prior art a reversal of travel direction can be automatically started after the driver has selected on a control device such a reversal of travel direction without the clutches being quickly worn or destroyed, or substantially larger clutches or a larger transmission than in the prior art being required. In addition, a jerk-free driving operation is ensured even during reversal of travel direction.

BRIEF DESCRIPTION OF THE DRAWINGS

The invention is described below with reference to the accompanying drawings in which.

DESCRIPTION OF THE PREFERRED EMBODIMENT

Figure 1:
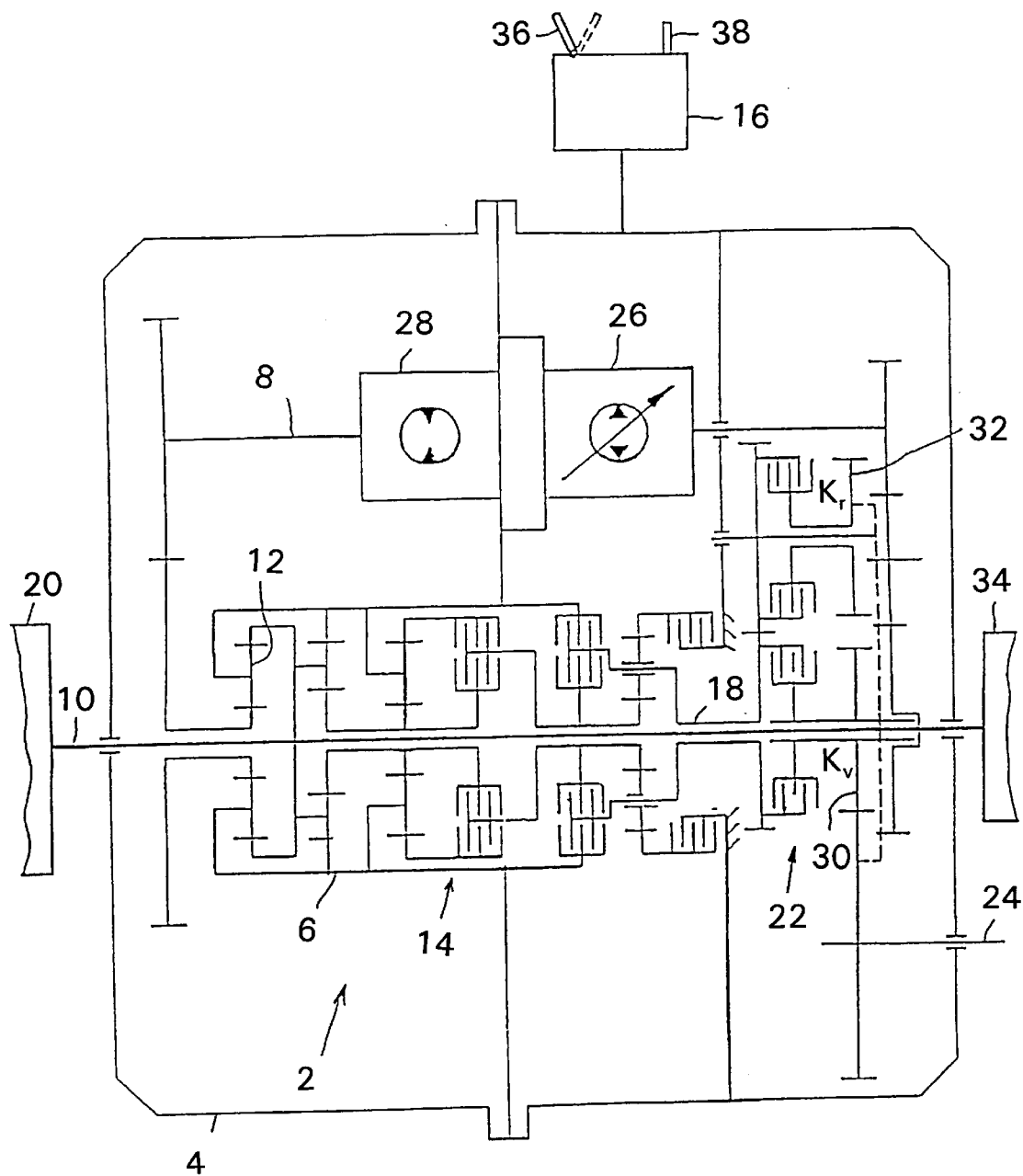
FIG. 1 is a diagrammatic view of a drive train of a motor vehicle of the kind such as known from WO 97/01049 and an electronic device according to the invention, wherein the drive train has a transmission with continuously variable ratio for reversal of travel direction (reversal of the direction of rotation of the output)

The transmission with continuously variable ratio shown in FIG. 1 is a hydrostatic mechanical power split and power summarizing gearing 2 in a housing 4. It contains a mechanical power branch 6 and a hydraulic power branch 8. Both are driven by a main input shaft 10 and their outputs are summarized via a planetary gear set 12 which is part of a selector gearing 14 having several automatically shiftable gears.

The hydrostatic power branch 8 contains consecutively, in the driving direction, an adjustable hydrostatic pump 26, and a hydrostatic motor 28, as known from WO 97/01040.

The selector gearing 14 and the hydrostatic motor 28 are controlled and/or regulated by an electronic control device 16 in order to change the ratio of the transmission 2 without interrupting the traction either in the sense of a higher vehicle speed by upshifting or in the sense of a lower vehicle speed by downshifting. The selector gearing 14 can be designed corresponding to the mechanical driving branch, as known from WO 97/01049, or in a different way. The combination of selector gearing 14 and hydrostatic unit 26, 28 can be replaced by a different arrangement with a continuously variable ratio such as an endless input belt adjustable between gears or rollers of different diameters. For these reasons, the gearing 2 is hereinafter designated as "transmission".

The main input shaft 10 is driven on its end outside the housing 4 by a motor 20. An output shaft 18 of the transmission 2 is connectable via a reversing gear 22, optionally by closing a forward motion clutch $K_v$ or a reverse motion clutch $K_r$, with a main output shaft 24 in order to drive the latter in either direction of rotation. The reversing gear 22 contains a gearing branch 30 with the forward motion clutch $K_v$ for forward motion and a gearing branch 32 of the same or different ratio but with a different number of gear wheels and with the reverse motion clutch $K_r$ for reverse motion. The clutches $K_v$ and $K_r$ and the reversing gear 22 can be parts of the transmission 2 instead of separate parts. The reversing gear 22 can have shaftable gears.

To the main input shaft 10 another aggregate 34 (power take off, PTO) driven by it can be attached on the side of the housing 4 remote from the motor 20, as diagrammatically shown.

A driver can select on a selector element 36 of the electronic control device 16 forward motion or reverse motion of the motor vehicle.

The control device 16 is preferably formed by a fixed or variable program contained therein so that after a person selects a reversal of travel direction at a vehicle speed above a preset limit, such as 10 km/h, it automatically performs each one of the following steps:

1.1. reduction of the traveling speed by continuously regulated and controlled downshifting of the transmission ratio to a lower traveling speed;

1.2. upon reaching or falling below the limiting speed, the open clutch of the new travel direction is automatically brought to friction-slip with pressure modulation and, overlapping in time with the friction-slip operation, the slip-free closed clutch of the preceding travel direction is likewise brought to friction-slip operation by reducing the closing pressure so that the input torque is transmitted without interruption from the old clutch to the new clutch. The friction work of the old direction clutch can be used to produce an additional braking torque for braking power of the motor. There is the possibility that the clutch of the preceding travel direction is brought to friction-slip operation, the new directional clutch only being brought to friction-slip operation when the limiting speed has been reached in order to prevent too high a thermal load. The friction-slip state of the old directional clutch is maintained until a sufficiently low traveling speed of the vehicle has been obtained so that the further delay can be assumed by the new directional clutch. At this shifting point, the known clutch pressure of the old clutch is used for the purpose of determining the clutch pressure of the new directional clutch and to shift without jerk;

1.3. after complete opening of the old clutch so that it no longer has any friction-slip, the friction-slip operation of the clutch of the new travel direction is automatically kept until thereby the vehicle is decelerated to stoppage and accelerated in the new travel direction until the driven side and the driven off side of the clutch of the new travel direction have reached synchronous running;

1.4. after synchronous running of the driving clutch side and of the driven clutch side of the new travel direction has been reached, the closing pressure of this new clutch is raised up to system pressure at which no slip operation can any longer occur in the clutch;

1.5. that the control device automatically skips the first step 1.1. and goes to the second step 1.2. when upon selection of a reversal of travel direction the vehicle speed is at limiting speed or below.

During the reversal operation, as long as the new and/or the old clutch $K_v$ or $K_r$ work with friction-slip, the ratio of the transmission 2 is preferably kept constant.

In order that the clutch $K_v$ or $K_r$ of the new travel direction can work punctually with friction-slip, it is filled with actuation fluid preferably already during the steps 1.1.

In order that the clutch $K_v$ or $K_r$ of the old travel direction can be brought to an accurately determinable operation point of the new clutch $K_v$ or $K_r$ from the completely closed operating position to friction-slip operation, the closing pressure of the old clutch $K_v$ or $K_r$ is already automatically reduced when during the step 1.1. the transmission 2 has been downshifted to a lower vehicle speed.

Details of the invention are described herebelow:

1. Requirements and Relevant Speed Ranges

Unlike the prior art, the invention makes possible a reversal from travel speeds decidedly higher than a limiting speed such as $V_{R,max}$ of 10 km/h without the friction clutches having to be designed for such loads. To this end, the strategy described below, is divided, i.e. in three phases with which two speed ranges are associated:

a) speed range I concerning a vehicle speed above a maximum limit speed $V_{R,max}$ or above a motor limiting rotational speed. Since the clutches $K_v$ and $K_r$ have not been designed for such high reversal speeds, there takes place a downshift of the ratio of the transmission 2 from the actual ratio to the lower ratio at which the limiting speed $V_{R,max}$ is reached at a preset motor rotational speed $\omega_{mot}$. The required driving range or gear of the transmission 2 depends on the motor rotational speed (usually travel speed range 2 or 3; see FIG. 2). An eventual driver's engagement via the accelerator pedal (increase of the motor rotational speed; required, i.e. for a power take off 34) should not lead in the delay phase of the vehicle to an acceleration of the vehicle.

b) speed range II concerning a vehicle speed at or below the limiting speed $V_{R,max}$ or a maximum motor rotational speed $\omega_{max}$:

below the limiting speed $V_{R,max}$ the resulting ratio of the transmission 2 is kept constant or followed up to minimize the friction work and the power reversal is conducted exclusively via the directional clutches $K_v$ and $K_r$. At the same time, a comfortable transition of the delay or of the acceleration between driving ranges is sought.

c) speed range I in opposite travel direction at a vehicle speed above the limiting speed $V_{R,max}$ or the motor nominal rotational speed $\omega_{max}$:

The vehicle must be accelerated up to the actual speed standard or nominal speed $V_{Soll}$ in the new travel direction (traction upshift; the transmission 2 is shifted while the motor of the vehicle is accelerated).

During reversal the following aspects must be taken into consideration:

a) By the reversal the motor 16 must not be unallowably decelerated or throttled.

b) During delay of the vehicle in coasting operation (vehicle moves the motor), the maximum allowable motor rotational speed must not be exceeded.

c) The vehicle must keep, during reversal of travel direction, a uniform delay or acceleration preset by the driver.

d) A jerk-free reversal operation must be ensured, especially in the transition to and from the power reversal (friction-slip operation of the clutches $K_v$ and/or $K_r$).

2. The Driver's Possibilities of Engagement

The driver must have available different possibilities for control of the reversal operation:

a) Clutch:

The clutch pedal limits the pressure of the clutch $K_v$ or $K_r$ of the new travel direction (inch function) to be engaged. Thereby the reversal operation can be slowed down and consequently arranged with less delay or acceleration.

Brake:

By actuating the brake, the delay operation of the vehicle during power reversal can be accelerated and the acceleration operation delayed to the speed range II.

Gas:

During a delay of the vehicle speed by continuous adjustment of the ratio of the transmission 2, a rotational speed increase desired by the driver and adjusted on the accelerator pedal is detected by the hydrostatic units 26, 28. But the power reversal (reversal of travel direction by friction-slip operation of the clutches $K_v$ and/or $K_r$) develops more quickly when the driver gives more gas by the accelerator pedal.

b) Ratio adjustment:

The control device 16 can have a ratio adjustment element 38 with which the driver can adjust a nominal ratio of the transmission 2. With the manual adjustment of a nominal ratio, an automatic change of ratio is cut off. When the ratio adjustment element 38 is actuated after adjustment of a reversal error on the selector element of travel direction, the new ratio standard or the new ratio nominal value applies only to the new travel direction.

3. Summary of the Driving and Reversal Ranges

Figure 2:
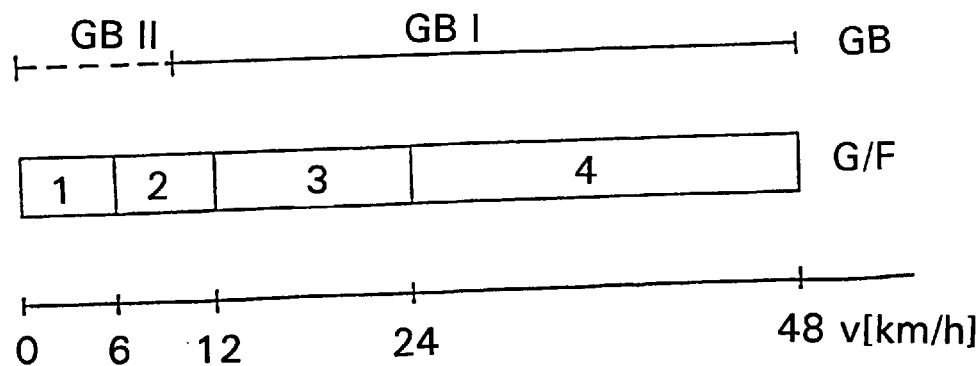
FIG. 2 is a summary over driving ranges of vehicle speeds (corresponds to the output rotational speed of the transmission) or gears of the transmission with continuously variable ratio and appertaining speed ranges which are relevant for a reversal of travel direction, wherein a first speed range GB (which is, for example, above a vehicle speed of 10 km/h, a reversal of the travel direction by upshifts or downshifts of the driving ranges (or gears) is introduced, and in a second speed range GB II the travel direction is reversed by friction-slip operation of the directional clutches (power reversal)

In FIG. 2 is shown the coordination between the two driving ranges GB I and GB II, the corresponding driving ranges or gears of the transmission 2 and the vehicle speeds up to a maximum speed of $V_{R,max}=48$ km/h for a motor rotational speed such as of 2,300 rev/min. At low rotational speeds of the motor, there can take place, together with the driving ranges 1 and 2, a power reversal in the driving range 3. In FIG. 2, the line of gears or driving ranges is designated with G/F. The line of the speed ranges is designated with GB. In the speed range GB I, a reversal of travel direction is effected by downshifting or upshifting the transmission 2. In the speed range GB II, the power reversal takes place.

4. Fundamental Sequence of the Reversal Process 4.1. Delay by coasting downshift/traction downshift (speed range I).

In the speed range I (traveling speed v higher than limiting speed $V_{R,max}$), the vehicle is first delayed by automatic and steady adjustment of the gear ratio of the transmission 2. The motor is here in the coasting operation or traction operation. The motor rotational speed is automatically monitored with regard to its maximum admissible rotational speed. When a limiting value is reached, the nominal value of the transmission ratio is automatically adapted accordingly. In an acceleration preset by the driver, e.g. by intensive gas supply, the nominal value standard for the ratio of the transmission 2 (adaptation of increase of the nominal value) is automatically modified.

4.2. Power reversal via the directional clutches $K_v$ and $K_r$ (speed range II).

Reactions to driver engagement:

The driver can control the reversal operation by actuating the clutch, brake, accelerator pedal, manual adjustment of the ratio of the transmission 2, or by an acceleration selector element.

5. Detailed Sequence of the Reversal Operation

Figure 3:
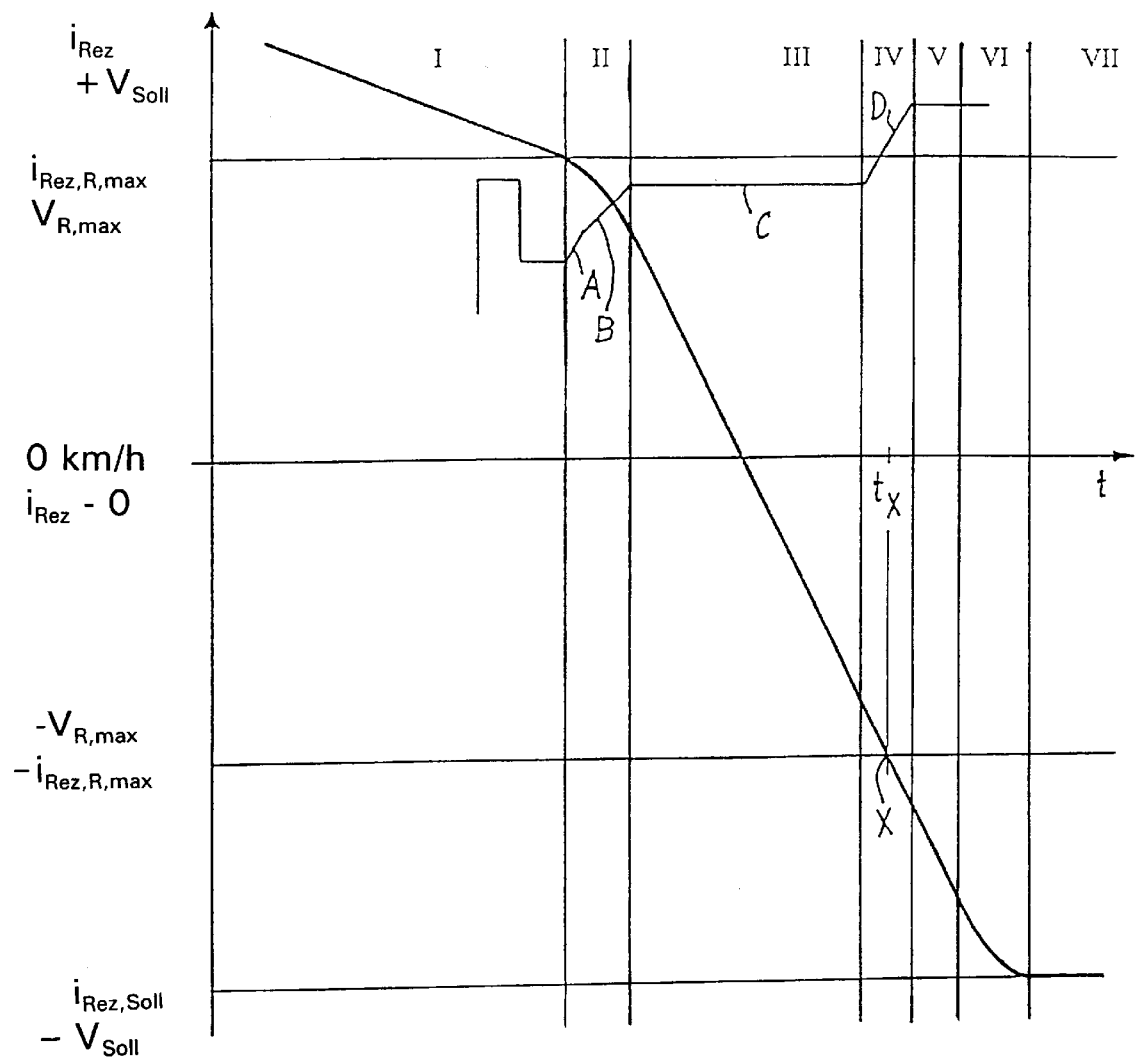
FIG. 3 is a diagram of the nominal speed of the vehicle and of the reciprocal value of the continuously variable ratio of the transmission corresponding thereto depending on the time, wherein are shown above the traveling speed 0 km/h the traveling speed in the initial travel direction and, below the speed 0 km/h, the traveling speed in the new travel direction, the reversal operation being divided along the time axis in reversal ranges or reversal time sections I, II, III, IV, V, VI and VII and, in addition, the clutch pressure of the clutch of the new travel direction of FIG. 4 being classified by time.

FIG. 3 shows the sequence of the reversal operation with reference to a diagram where time t is plotted on a horizontal axis and the vehicle speed v in both directions is plotted on a vertical axis, the vehicle speed being calculated by the reciprocal value $i_{Rez}$ of the ratio of the transmission 2 and by the rotational speed of the motor. Therefore, the expression "ratio" is used hereinafter to represent the reciprocal ratio. The plus range is the vehicle direction, such as forward motion, and the minus range is the other travel direction, such as reverse drive. The meaning of $i_{Rez}$ is the reciprocal value of the ratio of the transmission 2 (disregarding a possible fixed or shiftable ratio in the reversing gear 22); of $i_{Rez,R,max}$ the rotational-speed dependent maximum value of the reciprocal value at and below which a power reversal can be started by friction-slip operation of the clutches $K_v$ and $K_r$. The reversal operation is divided in FIG. 3 into the ranges I, II, III, IV, V, VI and VII.

5.1. Nominal sequence of the ratio of the transmission 2 during reversal.

The nominal value ratio sequence shown in FIG. 3 is adjusted only in the reversal ranges I, IV, VII by the provided regulation device of the control device 16. It is assumed here that a reversal from forward motion to reverse motion takes place, but the same ratio sequence results also during a reversal from reverse motion to forward motion. In the ranges II and III, by means of automatic control of the clutches $K_v$ and/or $K_r$ by the control device 16, a torque is produced which when the external conditions remain equal (e.g. no change in tractional resistance) has a qualitatively similar sequence to the curve shown in FIG. 3.

In the table that follows the reversal operation is described with reference to the individual reversal ranges I–VII and the speed ranges GB I and GB II:

| Reversal Range | Speed Range | Brief Description |
| --- | --- | --- |
| RB I | GB I | deceleration of vehicle speed by regulated and controlled downshift of the ratio of the transmission 2 |
| RB II | GB II | take over of the old and adjustment of the new delay torque of the vehicle from the clutch of the old travel direction to the clutch of the new travel direction ($K_v$, $K_r$); the motor 2 optionally passes from coasting operation to traction operation |
| RB III | GB III | deceleration/acceleration maintained |
| RB IV | GB IV | the new clutch ($K_r$, for example) taking over the torque terminates at the "X" moment its friction-slip operation, i.e. it becomes fully closed; the clutch torque is applied by upshift of the transmission |
| RB V | GB V | vehicle acceleration maintained |
| RB VI | GB VI | brake down of vehicle acceleration |
| RB VII | GB VII | adjustment of $i_{Rez.\ Soll}$, i.e. the nominal ratio and the nominal vehicle speed |

6. Parameterization of the Control

Figure 4:
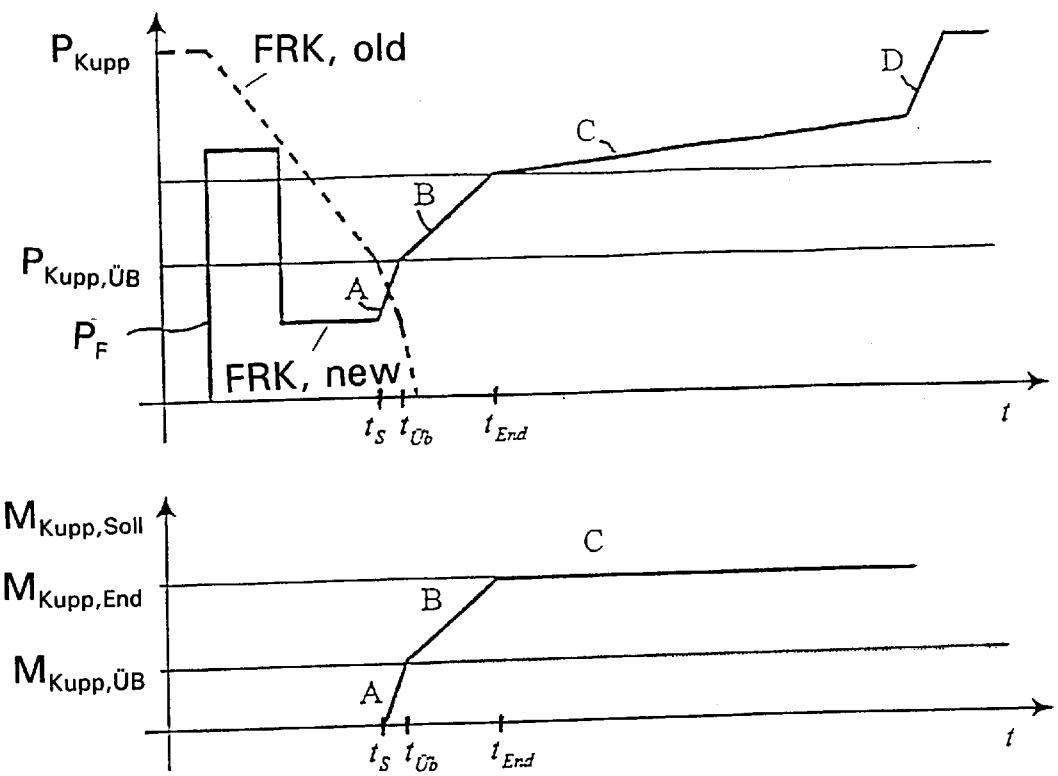
FIG. 4 is an upper diagram with parameterizable clutch control characteristic lines of the clutch closing pressures in the course of time, wherein the pressure of the old clutch $K_v$ (clutch of the old travel direction) is shown in dotted lines and the pressure of the new clutch $K_r$ (clutch of the new travel direction) in solid lines, and a lower diagram which shows the torques transmitted by the new clutch depending on time and depending on the closing pressure of the old clutch $K_v$.

FIG. 4 shows in the upper diagram parameterizable clutch control characteristic lines and in the lower diagram the torques corresponding thereto which are transmitted by the engaged clutch $K_r$ (or $K_v$) of the new travel direction. The upper diagram shows the time t on the horizontal axis and the clutch closing pressures "P" on the vertical axis. The lower diagram shows time t on the horizontal axis and the correspondingly transmitted torque "M" of the new clutch ($K_r$ or $K_v$) on the vertical axis.

The clutch closing pressure of the old travel direction "FRK, old" ($K_v$ or $K_r$) is shown in dotted lines and the clutch closing pressure of the new clutch "FRK, new" ($K_r$ or $K_v$) of the new travel direction is shown in solid lines. Prior in time to the clutch pressure which effects on the new clutch "FRK, new", a torque transmission, the hydraulic pressure $P_f$ of the hydraulic fluid with which the new clutch is filled is shown. It can be seen from the upper diagram of FIG. 4 that the clutch filling phase $P_f$ of the new clutch "FRK, new" takes place while the clutch closing pressure of the old clutch "FRK, old" is broken down but before the old clutch changes over from fully closed state to friction-slip operation at the $t_s$ moment with a closing pressure$_{Pkupp,ÜB}$. Approximately at the same time of the moment $t_s$ the new clutch "FRK, new" is closed to the extent that its clutch disks work with friction-slip. Up to the other moment $t_ÜB$ the closing pressure of the old clutch "FRK, old" breaks down to the extent that it opens completely and its disks have no more friction-slip, while simultaneously the closing pressure of the new clutch "FRK, new" is increased to the extent that it assumes the whole torque, but from then on works with friction-slip. In the range A, between the two moments $t_s$ and $t_ÜB$ the torque to be transmitted is transmitted in the shortest possible time from the old to the new clutch. In the following range B, between the moments $t_ÜB$ and $t_{End}$, the torque desired for reversing, which is deduced from the wish of the driver, is built up in the new clutch. In the range C that follows, the torque is kept substantially constant. A slight increase or ramp of the clutch pressure serves when needed to compensate the friction value. When the electronic control device 16 establishes the synchronization of both clutch disks of the new clutch "FRK, new" ($K_v$ or $K_r$), the clutch pressure in the range D is brought in the form of a steeper ramp to the final system pressure. Alternatively, the clutch closing pressure can first be raised by means of a moderately steep ramp until the clutch disks finally adhere. After the final adherence of the clutch disks, the pressure is quickly raised to the system pressure. In order to prevent with certainty a jolt during transition from the reversal by clutch friction-slip to reversal by ratio adjustment of the transmission 2, the initial change of the ratio adjustment can be automatically determined by means of the hydrostatic units 26, 28 from the actually existing clutch torque.

Blockage of the reversing gear:

To block the reversing gear 22, the control device 16 simultaneously closes both reversing clutches $K_v$ or $K_r$. Thereby the vehicle, in case it was moving, is decelerated to stoppage and the drive train is thereby blocked. A loading of the motor is prevented by endlessly adjusting either the ratio on the continuously variable transmission 2 or a coupling element cutting off the flow of force from the motor.

7. Reversal via the Directional Clutches above the Limiting Speed $V_{R,max}$

Figure 5:
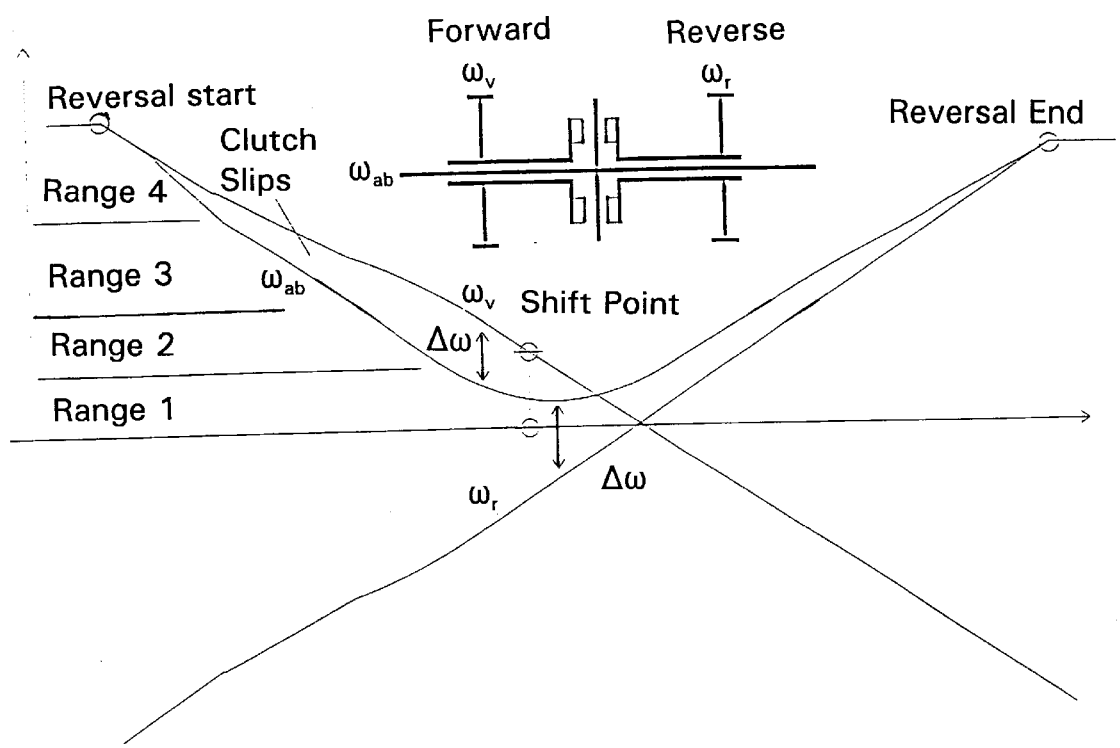
FIG. 5 is a reversal operation in which the beginning of the reversal is shown with the point reversal start and the end of the reversal operation with the point reversal end. The line $\omega_{ab}$ represents the output rotational speed of the clutch shaft, the line $\omega_v$ represents the rotational speed of the forward motion clutch, the line $\omega_r$ represents the rotational speed of the reverse motion clutch and line $\Delta\omega$ represents the rotational speed difference between the output shaft and the input shaft. After start of the reversal, the forward motion clutch begins to slip until it is entirely open below range one, the reverse drive clutch begins to close with the start of the reversal until becoming completely closed at the end of the reversal.

In FIG. 5 is shown a reversal operation above $V_{R,max}$ via the directional clutches. After the reversal command the gear begins to raise the ratio. The output rotational speed is kept constant and the motor changes over to coasting operation. The pressure on the actual directional clutch forward is reduced until under control the clutch passes to slip. The output rotational speed $\omega_{ab}$ runs on in front of the input rotational speed $\omega_v$, controlled by the clutch pressure and the ratio adjustment. The friction work produced is limited by the limited differential rotational speed $\Delta\omega$. $\omega_v$ follows the standard direction and the vehicle is decelerated while the directional clutch slips. The gear ratio is permanently automatically adapted by the control device 16 in order that the differential rotational speed $\Delta\omega$ does not exceed a preset value, thus preventing too high a friction work and an overheating of the clutches associated therewith. Range shifts in the planetary roller are carried out while the clutch slips, and possible oscillations of rotational speed $\omega_{ab}$ do not reach the vehicle wheel. Gear shifts over several ranges can thus be carried out without impairing comfort. In addition, possible mechanical vibrations in the input train are damped.

If the shifting point is reached (at this point the $\Delta\omega$ of the new directional clutch in reverse is small enough to prevent a thermal overload), the actual pressure of the directional clutch forward is used as a reference pressure for the control of the directional clutch in reverse. The torque produced thus has a similar value and a comfortable shift to the new clutch is possible during constant delay. Similarly, when decelerating the vehicle via the forward clutch, the added acceleration while the directional clutch slips and during shifts of range can be comfortably carried out. If the clutch closes, the reversal operation is terminated by ratio adjustment.

As an alternative to this procedure, the torque to be adjusted on the new directional clutch is calculated including the mathematical gear pattern from the regulated change of ratio and from the gear input torque.

| Reference numerals | |
|---|---|
| $K_v$ forward motion clutch | 18 output shaft of transmission 2 |
| $K_r$ reverse motion clutch | 20 motor |
| 2 transmission; hydrostatic mechanical power split and power summarizing gear | 22 reversing gear |
| | 24 main output shaft |
| | 26 adjustable hydrostatic pump |
| 4 housing | 28 hydrostatic motor |
| 6 mechanical power branch | 30 gear branch - forward |
| 8 hydrostatic power branch | 32 gear branch - reverse |
| 10 main input shaft | 34 aggregate (PTO) |
| 12 planetary gear set | 36 travel-direction selector element |
| 14 selector gear | |
| 16 control device | 38 ratio adjusting element |

What is claimed is:

1. A method to control a motor vehicle drive train, said train having one transmission (2) with a continuously variable ratio, one reversing gear (22), at least one optionally actuatable clutch ($K_v$) for a forward motion, one clutch ($K_r$) for a reverse motion, and one control device (16) for an automatic reversal of an original travel direction, comprising the following steps:

selecting the automatic reversal of the original travel direction from one of the forward motion to the reverse motion and the reverse motion to the forward motion, by a person on said control device (16);

selecting the automatic reversal of the original travel direction by a person at a first travel speed above a preset limiting speed ($V_{R,max}$), and carrying out each following steps automatically:

a) reducing the first travel speed to a lower traveling speed, by continuously regulating and controlling a downshifting of a transmission ratio, b) determining one of reaching and falling below the limiting speed ($V_{R,max}$), automatically changing a previously open clutch of a new travel direction to a friction-slip state by a pressure modulation, bringing a friction-slip free previously closed clutch of the original travel direction to the friction-slip state, by reducing a closing pressure, overlapping in time the friction-slip state change of the previously open clutch, and transmitting an input torque interruption-free and jolt-free from the previously closed clutch to the previously open clutch, c) automatically maintaining as friction-slip free the previously closed clutch following a complete opening of said clutch, and automatically maintaining a friction-slip operation of the previously open clutch until the vehicle is decelerated to a stop and accelerated in the new travel direction, until both a driven side and a driven-off side of the previously open clutch of the new travel direction have reached a synchronous running, d) raising the closing pressure of the previously open clutch after reaching the synchronous running, to a system pressure allowing friction-slip free operation to occur in said previously open clutch, and e) automatically skipping step a) and applying steps b) to c), by said control device, upon selection of the new travel direction wherein the vehicle speed is one of at the limiting speed ($V_{R,max}$) and below the limiting speed ($V_{R,max}$).

2. The method according to claim 1, comprising the step of:

determining, if during the reversal of the original direction, one of the previously open clutch and previously closed clutch works with friction-slip, the ratio of the transmission is retained constant.

3. The method according to claim 1, comprising the step of:

automatically filling the previously open clutch of the new travel direction with an actuation fluid while delaying the vehicle speed by a regulated and controlled downshifting of the ratio of the transmission.

4. The method according to claim 3, comprising the step of:

automatically reducing the closing pressure of the previously closed clutch when the transmission reduces the vehicle speed by the downshifting of the ratio.

5. The method according to claim 1, comprising the step of:

automatically upshifting the transmission upon slip free working of the previously open clutch, with jolt-free transition, until the vehicle has reached a preset nominal speed which is one of an original nominal speed of the original travel direction prior to selection of the reversal operation and a new nominal speed selected thereafter.

6. The method according to claim 1, comprising the step of:

maintaining the rotational speed of the motor driving the power train during the friction-slip operation of the one of previously open clutch and previously closed clutch, during the reversal of the travel direction, kept one of automatically constant by the control device and variable only in a narrow range of the rotational speed.

7. A device to control a motor vehicle drive train, said drive train having one transmission (2) with a continuously variable ratio, one reversing gear (22), at least one optionally actuatable clutch (Kv) for forward motion, and a clutch (Kr) for reverse motion, comprising the following:

one control device (16) for an automatic reversal of a travel direction, wherein the reversal of the travel direction from one of forward motion to reverse motion and reverse motion to forward motion is selected by a person on said control device and automatically carried out thereby, characterized in that said control device (16) being designed so that after the reversal of the travel direction is selected by the person, at a vehicle speed above a preset limiting speed ($V_{R,max}$), said control device automatically carries out the following steps:

a) reducing the first travel speed to a lower traveling speed, by continuously regulating and controlling a downshifting of a transmission ratio, b) determining one of reaching and falling below the limiting speed ($V_{R,max}$), automatically changing a previously open clutch of a new travel direction to a friction-slip state by a pressure modulation, bringing a friction-slip free previously closed clutch of the original travel direction to the friction-slip state, by reducing a closing pressure, overlapping in time the friction-slip state change of the previously open clutch, and transmitting an input torque interruption-free and jolt-free from the previously closed clutch to the previously open clutch, c) automatically maintaining as friction-slip free the previously closed clutch following a complete opening of said clutch, and automatically maintaining a friction-slip operation of the previously open clutch until the vehicle is decelerated to a stop and accelerated in the new travel direction, until both a driven side and a driven-off side of the previously open clutch of the new travel direction have reached a synchronous running, d) raising the closing pressure of the previously open clutch after reaching the synchronous running, to a system pressure allowing friction-slip free operation to occur in said previously open clutch, and e) automatically skipping step a) and applying steps b) to d), by said control device, upon selection of the new travel direction wherein the vehicle speed is one of at the limiting speed ($V_{R,max}$) and below the limiting speed ($V_{R,max}$).

8. The device according to claim 7, wherein during the automatic reversal of the travel direction, if one of the previously closed clutch and the previously open clutch work with friction-slip, the ratio of the transmission (2) is kept constant.

9. The device according to claim 7, wherein the previously closed clutch is previously automatically filled with an actuation fluid while delaying the vehicle speed by a regulated and controlled downshifting of the ratio of the transmission (2).

10. The device according to claim 7, wherein the closing pressure of the previously closed clutch is previously automatically reduced while the transmission (2) reduces the vehicle speed by downshifting the ratio of the transmission.

11. The device according to claim 7, wherein after the previously open clutch works slip free, the transmission (2) is automatically upshifted with jerk-free transition until the vehicle has reached a preset nominal speed which is the nominal speed of the previous travel direction prior to selection of a reversal operation or a new nominal speed selected thereafter.

12. The device according to claim 7, wherein a rotational speed of a motor (20) that actuates the drive train during the friction-slip operation of one of the clutch for forward motion ($K_v$) and the clutch for reverse motion ($K_r$), during the reversal of travel direction is maintained one of automatically kept constant by said control device (16) and variable only within a narrow rotational speed range.

13. A method to control a motor vehicle drive train having one transmission (2) with continuously variable ratio, one reversing gear (22), at least one optionally actuatable clutch ($K_v$) for forward motion and one clutch ($K_r$) for reverse motion and one control device (16) for automatic reversal of a travel direction comprised of the following steps:

selecting a reversal of the travel direction from one of forward motion to reverse motion and reverse motion to forward motion by a person on said control device (16), automatically carrying out said selecting, automatically carrying out each of the following steps when the automatic reversal of travel direction at a travel speed above a preset limit speed ($V_{R,max}$) is selected:

a) Lifting a gear ratio and pressure-modulated closing of a previously open clutch of a new travel direction so that the previously open clutch is brought to a friction-slip operation, and bringing to friction-slip operation a slip-free previously closed clutch of an old travel direction by a closing pressure reduction with a pressure modulation, overlapping in time with said previously open clutch, b) Permanently varying a ratio of the gear so that a parameterized maximum rotational speed difference between an input side and an output side of the clutch device is not exceeded, continuously calculating a friction work of both the clutch for forward motion and the clutch for reverse motion, comparing the friction work with admissible values and thus a rotational speed difference does not exceed a maximum value, c) Maintaining the friction-slip until the vehicle is decelerated to stoppage and is accelerated in the new travel direction until a driven side and a driven off side of the previously open clutch have reached a synchronous running, and d) Raising a closing pressure of said previously open clutch to a system pressure at which slip-free operation occurs on said clutch after a synchronous running of a driving clutch side and of a driven clutch side of the new travel direction has been reached.

14. The method according to claim 1, comprising the step of:

superimposing an automatic control of a friction work of the clutch device, which results from changing the ratio of the gear, on the clutch actuating pressure which is automatically produced in the clutch device for the travel direction change of the motor vehicle depending on a change in travel direction selected by the driver on a selector device of travel direction, the clutch device having at least one clutch for forward motion and at least one clutch for reverse motion.

* * * * *